(12) United States Patent
Bidgoli et al.

(10) Patent No.: US 11,399,006 B2
(45) Date of Patent: Jul. 26, 2022

(54) ADDRESS GENERATION

(71) Applicant: Nokia Solutions and Networks Oy, Espoo (FI)

(72) Inventors: Hooman Bidgoli, Ottawa (CA); Michael Long, Nepean (CA)

(73) Assignee: Nokia Solutions and Networks Oy, Espoo (FI)

( * ) Notice: Subject to any disclaimer, the term of this patent is extended or adjusted under 35 U.S.C. 154(b) by 29 days.

(21) Appl. No.: 17/007,054

(22) Filed: Aug. 31, 2020

(65) Prior Publication Data
US 2022/0070137 A1    Mar. 3, 2022

(51) Int. Cl.
*H04L 61/45* (2022.01)
*H04L 61/5007* (2022.01)
*H04L 61/5092* (2022.01)
*G06F 9/30* (2018.01)
*H04L 101/622* (2022.01)

(52) U.S. Cl.
CPC ...... *H04L 61/1582* (2013.01); *H04L 61/2007* (2013.01); *H04L 61/2092* (2013.01); *G06F 9/3001* (2013.01); *G06F 9/30007* (2013.01); *H04L 61/6022* (2013.01)

(58) Field of Classification Search
None
See application file for complete search history.

(56) References Cited

U.S. PATENT DOCUMENTS

| | | | | |
|---|---|---|---|---|
| 5,757,795 A | * | 5/1998 | Schnell | H04L 45/745 370/392 |
| 6,230,231 B1 | * | 5/2001 | DeLong | H04L 12/4641 711/200 |
| 6,917,626 B1 | * | 7/2005 | Duwury | H04L 29/12292 370/466 |
| 8,339,991 B2 | * | 12/2012 | Biswas | H04L 61/2092 370/254 |
| 9,544,269 B2 | * | 1/2017 | Brzozowski | H04L 61/2015 |

(Continued)

OTHER PUBLICATIONS

EP Search Report mailed in corresponding EP Application No. 21190328.1 dated Jan. 24, 2022, 7 pages.

(Continued)

*Primary Examiner* — Kenny S Lin
(74) *Attorney, Agent, or Firm* — Tong, Rea, Bentley & Kim, LLC (57) ABSTRACT

Various example embodiments for supporting generation of addresses for network entities in communication systems are presented. Various example embodiments for supporting generation of addresses for network entities may be configured to support generation of a new address for a network entity based on an existing address of the network entity. Various example embodiments for supporting generation of addresses for network entities may be configured to support generation of a new address for a network entity based on manipulation of at least a portion of an existing address of the network entity. Various example embodiments for supporting generation of addresses for network entities may be configured to support generation of a transport layer address (e.g., an Internet Protocol (IP) address or the like) for a network entity based on a data link layer address (e.g., a Media Access Control (MAC) address or the like) of the network entity.

21 Claims, 3 Drawing Sheets

(56) References Cited

U.S. PATENT DOCUMENTS

| | | | |
|---|---|---|---|
| 2006/0034272 A1* | 2/2006 | Kawakami | H04L 29/12292 370/389 |
| 2016/0147669 A1* | 5/2016 | Huang | G06F 12/1018 711/128 |
| 2018/0139172 A1* | 5/2018 | Kim | H04L 61/2038 |

OTHER PUBLICATIONS

Hinden, R., et al., "IP Version 6 Addressing Architecture," Network Working Group, RFC 4291, Feb. 2006, 25 pages.

* cited by examiner

FIG. 3

ADDRESS GENERATION

TECHNICAL FIELD

Various example embodiments relate generally to communication systems and, more particularly but not exclusively, to supporting generation of addresses for network entities in communication systems.

BACKGROUND

In communication systems, various types of addresses may be used to identify various elements of the communication systems and to support communications of various elements of the communication systems.

SUMMARY

In at least some example embodiments, an apparatus includes at least one processor and at least one memory including a set of instructions, wherein the set of instructions is configured to, when executed by the at least one processor, cause the apparatus to select, from a first address of a network entity, a first set of bits of the first address, generate, based on at least one operation on the first set of bits, a second set of bits, generate, based on the second set of bits, a second address for the network entity, and associate the second address for the network entity with the network entity. In at least some example embodiments, the first address of the network entity includes a first unique address of the network entity, wherein the second address for the network entity includes a second unique address for the network entity. In at least some example embodiments, the network entity includes a network element, a port of a network element, or an interface of a network element. In at least some example embodiments, the first address includes a chassis address of the network entity or a port address of the network entity. In at least some example embodiments, the first set of bits of the first address is selected based on a determination that the first set of bits of the first address provides for uniqueness of the first address of the network entity. In at least some example embodiments, the first set of bits of the first address includes at least a portion of the first address. In at least some example embodiments, the first set of bits of the first address includes three to five bytes of the first address. In at least some example embodiments, the first set of bits of the first address includes all bytes of the first address. In at least some example embodiments, the at least one operation includes a shift of the first set of bits of the first address by a number of bit positions. In at least some example embodiments, the at least one operation further includes a logical OR operation using a number of bits equal to the number of bit positions. In at least some example embodiments, the number of bit positions includes one bit position and the number of bits is one bit. In at least some example embodiments, the logical OR operation is based on a value that includes a logical zero. In at least some example embodiments, the number of bit positions includes at least two bit positions and the number of bits includes at least two bits. In at least some example embodiments, the logical OR operation is based on a value that includes at least one logical zero. In at least some example embodiments, the second address for the network entity is generated using the second set of bits as least significant bits of the second address for the network entity. In at least some example embodiments, any remaining bits of the second address for the network entity are used to identify a network. In at least some example embodiments, the three least significant bytes of the second address are used for uniqueness of network entity and the most significant byte of the second address is used to identify a network. In at least some example embodiments, any remaining bits of the second address are used to identify a network or used to identify a network and a static host value. In at least some example embodiments, the six least significant bytes of the second address are used for uniqueness of the network entity and the ten most significant bytes of the second address are used to identify a network or used to identify a network and a static host value. In at least some example embodiments, the first address includes a data link layer address and the second address includes a transport layer address. In at least some example embodiments, the data link layer address includes a Media Access Control (MAC) address and the transport layer address includes an Internet Protocol (IP) address.

In at least some example embodiments, a non-transitory computer-readable medium stores a set of instructions configured to cause an apparatus to select, from a first address of a network entity, a first set of bits of the first address, generate, based on at least one operation on the first set of bits, a second set of bits, generate, based on the second set of bits, a second address for the network entity, and associate the second address for the network entity with the network entity. In at least some example embodiments, the first address of the network entity includes a first unique address of the network entity, wherein the second address for the network entity includes a second unique address for the network entity. In at least some example embodiments, the network entity includes a network element, a port of a network element, or an interface of a network element. In at least some example embodiments, the first address includes a chassis address of the network entity or a port address of the network entity. In at least some example embodiments, the first set of bits of the first address is selected based on a determination that the first set of bits of the first address provides for uniqueness of the first address of the network entity. In at least some example embodiments, the first set of bits of the first address includes at least a portion of the first address. In at least some example embodiments, the first set of bits of the first address includes three to five bytes of the first address. In at least some example embodiments, the first set of bits of the first address includes all bytes of the first address. In at least some example embodiments, the at least one operation includes a shift of the first set of bits of the first address by a number of bit positions. In at least some example embodiments, the at least one operation further includes a logical OR operation using a number of bits equal to the number of bit positions. In at least some example embodiments, the number of bit positions includes one bit position and the number of bits is one bit. In at least some example embodiments, the logical OR operation is based on a value that includes a logical zero. In at least some example embodiments, the number of bit positions includes at least two bit positions and the number of bits includes at least two bits. In at least some example embodiments, the logical OR operation is based on a value that includes at least one logical zero. In at least some example embodiments, the second address for the network entity is generated using the second set of bits as least significant bits of the second address for the network entity. In at least some example embodiments, any remaining bits of the second address for the network entity are used to identify a network. In at least some example embodiments, the three least significant bytes of the second address are used for uniqueness of network entity and the most significant byte of the second address is used to identify a network. In at least some example embodiments, any remaining bits of the second address are used to identify a network or used to identify a network and a static host value. In at least some example embodiments, the six least significant bytes of the second address are used for uniqueness of the network entity and the ten most significant bytes of the second address are used to identify a network or used to identify a network and a static host value. In at least some example embodiments, the first address includes a data link layer address and the second address includes a transport layer address. In at least some example embodiments, the data link layer address includes a Media Access Control (MAC) address and the transport layer address includes an Internet Protocol (IP) address.

In at least some example embodiments, a method includes selecting, from a first address of a network entity, a first set of bits of the first address, generating, based on at least one operation on the first set of bits, a second set of bits, generating, based on the second set of bits, a second address for the network entity, and associating the second address for the network entity with the network entity. In at least some example embodiments, the first address of the network entity includes a first unique address of the network entity, wherein the second address for the network entity includes a second unique address for the network entity. In at least some example embodiments, the network entity includes a network element, a port of a network element, or an interface of a network element. In at least some example embodiments, the first address includes a chassis address of the network entity or a port address of the network entity. In at least some example embodiments, the first set of bits of the first address is selected based on a determination that the first set of bits of the first address provides for uniqueness of the first address of the network entity. In at least some example embodiments, the first set of bits of the first address includes at least a portion of the first address. In at least some example embodiments, the first set of bits of the first address includes three to five bytes of the first address. In at least some example embodiments, the first set of bits of the first address includes all bytes of the first address. In at least some example embodiments, the at least one operation includes a shift of the first set of bits of the first address by a number of bit positions. In at least some example embodiments, the at least one operation further includes a logical OR operation using a number of bits equal to the number of bit positions. In at least some example embodiments, the number of bit positions includes one bit position and the number of bits is one bit. In at least some example embodiments, the logical OR operation is based on a value that includes a logical zero. In at least some example embodiments, the number of bit positions includes at least two bit positions and the number of bits includes at least two bits. In at least some example embodiments, the logical OR operation is based on a value that includes at least one logical zero. In at least some example embodiments, the second address for the network entity is generated using the second set of bits as least significant bits of the second address for the network entity. In at least some example embodiments, any remaining bits of the second address for the network entity are used to identify a network. In at least some example embodiments, the three least significant bytes of the second address are used for uniqueness of network entity and the most significant byte of the second address is used to identify a network. In at least some example embodiments, any remaining bits of the second address are used to identify a network or used to identify a network and a static host value. In at least some example embodiments, the six least significant bytes of the second address are used for uniqueness of the network entity and the ten most significant bytes of the second address are used to identify a network or used to identify a network and a static host value. In at least some example embodiments, the first address includes a data link layer address and the second address includes a transport layer address. In at least some example embodiments, the data link layer address includes a Media Access Control (MAC) address and the transport layer address includes an Internet Protocol (IP) address.

In at least some example embodiments, an apparatus includes means for selecting, from a first address of a network entity, a first set of bits of the first address, means for generating, based on at least one operation on the first set of bits, a second set of bits, means for generating, based on the second set of bits, a second address for the network entity, and means for associating the second address for the network entity with the network entity. In at least some example embodiments, the first address of the network entity includes a first unique address of the network entity, wherein the second address for the network entity includes a second unique address for the network entity. In at least some example embodiments, the network entity includes a network element, a port of a network element, or an interface of a network element. In at least some example embodiments, the first address includes a chassis address of the network entity or a port address of the network entity. In at least some example embodiments, the first set of bits of the first address is selected based on a determination that the first set of bits of the first address provides for uniqueness of the first address of the network entity. In at least some example embodiments, the first set of bits of the first address includes at least a portion of the first address. In at least some example embodiments, the first set of bits of the first address includes three to five bytes of the first address. In at least some example embodiments, the first set of bits of the first address includes all bytes of the first address. In at least some example embodiments, the at least one operation includes a shift of the first set of bits of the first address by a number of bit positions. In at least some example embodiments, the at least one operation further includes a logical OR operation using a number of bits equal to the number of bit positions. In at least some example embodiments, the number of bit positions includes one bit position and the number of bits is one bit. In at least some example embodiments, the logical OR operation is based on a value that includes a logical zero. In at least some example embodiments, the number of bit positions includes at least two bit positions and the number of bits includes at least two bits. In at least some example embodiments, the logical OR operation is based on a value that includes at least one logical zero. In at least some example embodiments, the second address for the network entity is generated using the second set of bits as least significant bits of the second address for the network entity. In at least some example embodiments, any remaining bits of the second address for the network entity are used to identify a network. In at least some example embodiments, the three least significant bytes of the second address are used for uniqueness of network entity and the most significant byte of the second address is used to identify a network. In at least some example embodiments, any remaining bits of the second address are used to identify a network or used to identify a network and a static host value. In at least some example embodiments, the six least significant bytes of the second address are used for uniqueness of the network entity and the ten most significant bytes of the second address are used to identify a network or used to identify a network and a static host value. In at least some example embodiments, the first address includes a data link layer address and the second address includes a transport layer address. In at least some example embodiments, the data link layer address includes a Media Access Control (MAC) address and the transport layer address includes an Internet Protocol (IP) address.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Various example embodiments for supporting generation of addresses for network entities in communication systems are presented. Various example embodiments for supporting generation of addresses for network entities may be configured to support generation of new addresses for various types of network entities (e.g., network elements, ports of network elements, interfaces of network elements, or the like). Various example embodiments for supporting generation of addresses for network entities may be configured to support generation of a new address for a network entity based on an existing address of the network entity. Various example embodiments for supporting generation of addresses for network entities may be configured to support generation of a new address for a network entity based on manipulation of at least a portion of an existing address of the network entity. Various example embodiments for supporting generation of addresses for network entities may be configured to support generation of a new address for a network entity based on manipulation of at least a portion of an existing address of the network entity using one or more operations (e.g., a bit shifting operation, one or more logical operations, or the like, as well as various combinations thereof). Various example embodiments for supporting generation of addresses for network entities may be configured to support generation of a transport layer address (e.g., an Internet Protocol (IP) address (e.g., an IPv4 address, IPv6 address, or the like) or other suitable transport layer address) for a network entity based on a data link layer address (e.g., a Media Access Control (MAC) address of other suitable data link layer address) of the network entity. Various example embodiments for supporting generation of addresses for network entities may be configured to support generation of unique addresses for network entities (e.g., generation of unique IP addresses for the network entities based on MAC addresses of the network entities). Various example embodiments for supporting generation of addresses for network entities may be configured to support generation of addresses for network entities within various contexts (e.g., during automated provisioning such as provisioning based on Zero Touch Provisioning (ZTP), during communications, or the like, as well as various combinations thereof). It will be appreciated that these and various other example embodiments and advantages or potential advantages of supporting generation of unique addresses for network entities may be further understood by way of reference to the various figures, which are discussed further below.

Figure 1:
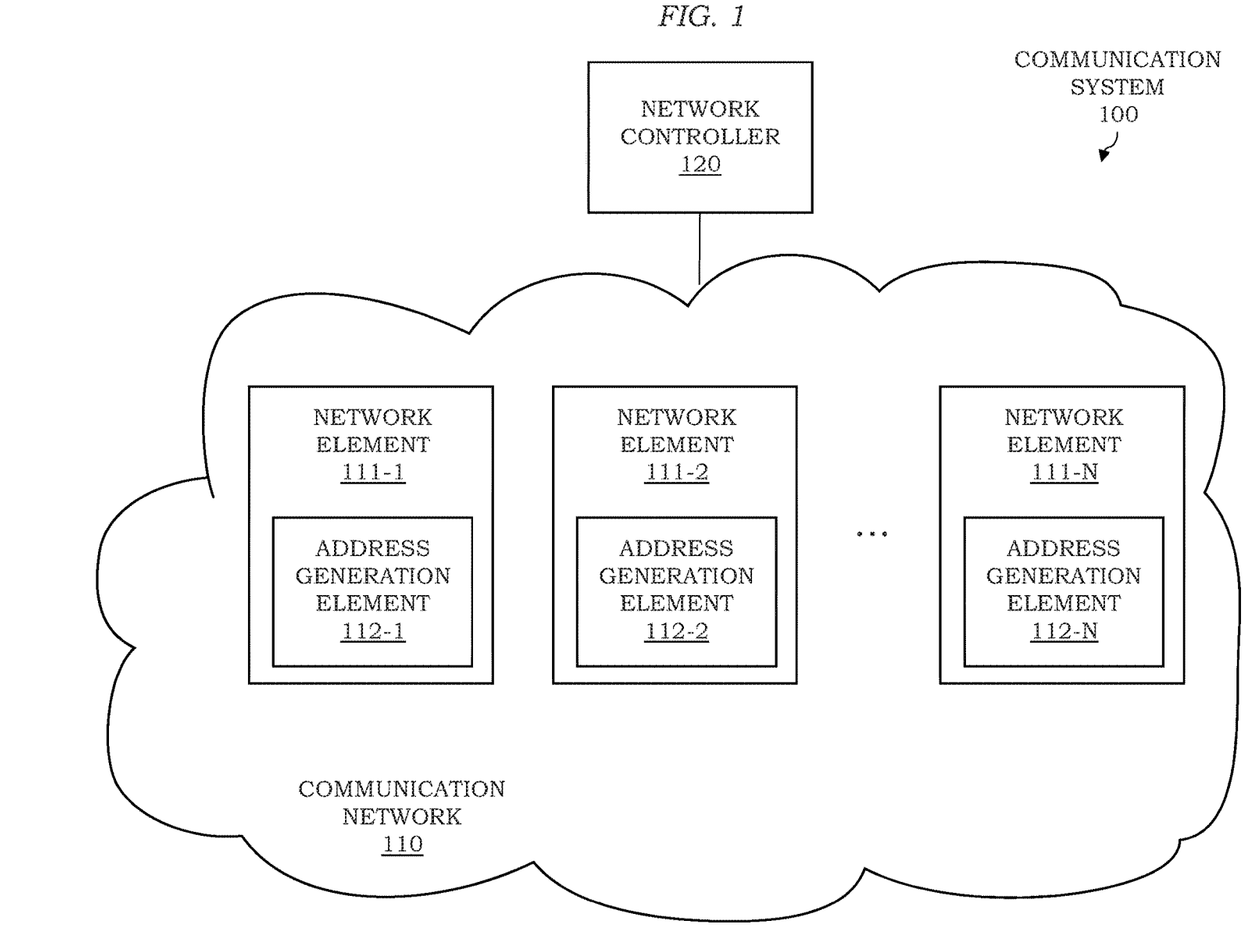
FIG. 1 depicts an example embodiment of a communication system configured to support generation of addresses for network entities.

FIG. 1 depicts an example embodiment of a communication system configured to support generation of unique addresses for network entities.

The communication system 100 includes a communication network 110 and a network controller 120. The communication network 110 is configured to support communications between various elements which are omitted for purposes of clarity (e.g., between end devices, between end devices and network devices, or the like). For example, such end devices may include end user devices (e.g., smartphones, laptop computers, desktop computers, printers, smart televisions, gaming systems, or the like), Internet-of-Things (IoT) devices (e.g., sensors, actuators, appliances, thermostats, or the like), or the like, as well as various combinations thereof. For example, such network devices may include servers (e.g., application servers, video servers, wed servers, or the like), virtual machines (VMs) hosted in datacenters, or the like, as well as various combinations thereof. For example, the communication network 110 may be a wireline network (e.g., a Digital Subscriber Line (DSL) network, a cable network, a fiber optic network, or the like), a wireless network (e.g., a Third Generation (3G) cellular network, a Fourth Generation (4G) cellular network, a 4G Long Term Evolution (LTE) cellular network, a Fifth Generation (5G) cellular network, a WiFi network, or the like), or the like, as well as various combinations thereof. The communication network 110 includes a set of network elements 111-1-111-N (collectively, network elements 111) configured to support communications for the communication network 110. For example, the network elements 111 may include routers, switches, or the like. The network elements 111 are deployed, connected, and configured to operate within the communication network 110. The network elements 111-1-111-N include address generation elements 112-1-112-N (collectively, address generation elements 112), respectively, which are configured to perform various address generation functions presented herein. The network controller 120 is configured to provide various control functions for the communication network 110 (e.g., provisioning, monitoring, management, or the like, as well as various combinations thereof).

The communication system 100 may support automated provisioning functions configured to support automated configuration of network elements 111 when the network elements 111 are deployed within the communication network 110. For example, ZTP techniques may be used to support automated network configuration in various contexts, such as in 5G cellular networks where a large number of network element are installed at cell sites of the cellular provider need to establish connectivity with the provider network to enable downloading of configuration files to support configuration of the network elements to operate within the 5G cellular networks. One type of ZTP technique is node discovery via Open Shortest Path First (OSPF), in which the information of a newly deployed network element is captured via OSPF (e.g., via an OSPF Type-Length-Value (TLV)) which is then communicated from the network element to the network manager. In order to support the communication of such information, the network element typically needs a unique IP address. In communication networks, IP addresses are commonly obtained via Dynamic Host Configuration Protocol (DHCP); however, in OSPF node discovery there is no DHCP server available for the network elements to obtain IP addresses. Accordingly, since there is no server from which the network elements may obtain IP addresses, the network elements may be configured to generate unique IP addresses which may be used by the network elements for temporary IP connectivity to the network in order to support automated node discovery and, therefore, automated node configuration. In at least some example embodiments, a unique IP address for a network element may be generated based on information available on the network element when the network element is deployed (e.g., based on the MAC address of the network element or other suitable types of information available on the network element when the network element is deployed). The network elements, using the generated IP addresses, may then advertise the IP addresses to the network manager via OSPF so that the network manager can connect to the network elements and configure the network elements to operate within the network. In this manner, generation of unique IP addresses for the network elements based on information available on the network elements when the network elements are deployed may be used to give the network elements temporary IP connectivity to the network to support automated node discovery and, thus, automated node configuration.

In at least some example embodiments, a unique IP address (e.g., IPv4, IPv6, or the like) is generated for a network element 111 from a MAC address of the network element 111. The unique IP address may be generated for the network element 111 based on use of at least a portion of the MAC address of the network element 111 to form at least a portion of the unique IP address for the network element 111. The unique IP address may be generated for the network element 111 based on manipulation of at least a portion of the MAC address of the network element 111 to form at least a portion of the unique IP address for the network element 111. The MAC address may be any suitable MAC address on the network element 111, such as a chassis MAC address, a port MAC address, or the like). The portion of the MAC address of the network element 111 that is used to generate the IP address for the network element 111 (e.g., the number of bytes of the MAC address that are selected and the location of the MAC address from which the bytes are selected) may vary for different network element types, for network elements from different equipment vendors (e.g., where different equipment vendors may use different portions of the MAC address to ensure uniqueness of MAC addresses on the nodes), or the like. The portion of the MAC address of the network element 111 that is used to generate the IP address for the network element 111 may be a portion of the MAC address which guarantees uniqueness of the IP address, which is likely to guarantee uniqueness of the IP address, which may result in uniqueness of the IP address, or the like.

In at least some example embodiments, the generation of a unique IP address for a network element 111 based on use of at least a portion of the MAC address of the network element 111 may include determining which portion of the MAC address of the network element 111 to use for generating the unique IP address for the network element 111. The determination of the portion of the MAC address of the network element 111 to use to generate the unique IP address for the network element 111 may include determining a portion of the MAC address which provides or is likely to provide uniqueness of the resulting IP address (e.g., based on network element type, equipment vendor, analysis of MAC addresses on the network element 111, or the like, as well as various combinations thereof). As indicated above, the portion of the MAC address of the network element 111 that guarantees or may guarantee uniqueness of the IP address for the network element 111 may vary across different network elements as equipment vendors may use different byte positions of the MAC address for this purpose. For example, where the five most significant bytes of the MAC address provide uniqueness of the MAC address for network elements, the least significant byte of the MAC address may be used to generate MAC addresses that repeat on the network elements (e.g., a first network element may support a range of MAC addresses {00:11:22:33:44:01 . . . 00:11:22:33:44:64}, a second network element may support a range of MAC addresses {01:11:22:33:ff:01 . . . 01:11:22:33:ff:64}, and so forth, with the five most significant bytes providing uniqueness across the network elements and the most significant byte providing differentiation on the network elements, respectively). Similarly, for example, where the four most significant bytes of the MAC address provide uniqueness of the MAC address for network elements, the two least significant bytes of the MAC address may be used to generate MAC addresses that repeat on the network elements. It will be appreciated that these are merely two examples of various ways in which the bytes of the MAC address may be configured to ensure uniqueness of MAC addresses for the network elements 111 (e.g., different numbers and positions of bits of the MAC address may be used by different vendors to ensure uniqueness of the MAC address). Accordingly, in at least some example embodiments, different portions of the MAC address of a network element 111 may be selected as the portion of the MAC address used to generate the unique IP address for the network element 111.

In at least some example embodiments, at least a portion of the MAC address of the network element 111 may be used to generate an IPv4 address for the network element 111. For example, where the most significant byte in the IPv4 address is the network assigned by the vendor, the least significant three bytes of the IPv4 address may be generated using three bytes of the MAC address. It will be appreciated that, while use of three bytes of the MAC address to generate the IPv4 address does provide at least some uniqueness of IPv4 address, it will not guarantee uniqueness of the IPv4 address (e.g., uniqueness is much more likely where five or six bytes of the MAC address are used in IP address generation). In at least some example embodiments, the network assigned by the vendor may be used as the most significant byte in the IPv4 address and the three least significant bytes of the IPv4 address which are used as the host portion of the IPv4 address may be generated from three bytes of the MAC address. It will be appreciated that, although primarily presented with respect to example embodiments in which the IPv4 address is generated based on manipulation of three bytes of the MAC address, in at least some example embodiments the IPv4 address may be generated based on manipulation of fewer or more bytes or bits of the MAC address.

In at least some example embodiments, at least a portion of the MAC address of the network element 111 may be used to generate an IPv6 address for the network element 111. The entire MAC address (6 bytes) may be used to generate the IPv6 address or a portion of the MAC address (less than 6 bytes) may be used to generate the IPv6 address. The N bytes generated for the IPv6 address may be used as the N least significant bytes of the IP address. It will be appreciated that use of more bytes of the MAC address to generate the IPv6 will be more likely to provide uniqueness of IPv6 address (e.g., use of at least five bytes of the MAC address to generate 5 bytes of the IP address may be sufficient to guarantee uniqueness of the IP address). In at least some example embodiments, the N bytes of the IP address generated from N bytes of the MAC address may be used as the N least significant bytes of the IPv6 address and the remaining bytes of the IPv6 address may be used as the network portion of the IPv6 address. In at least some example embodiments, the N bytes of the IP address generated from N bytes of the MAC address may be used as the N least significant bytes of the IPv6 address and the remaining bytes of the IPv6 address may be divided between the network and a static host value. It will be appreciated that, although primarily presented with respect to example embodiments in which the IPv6 address is generated based on manipulation of five or six bytes of the MAC address, in at least some example embodiments the IPv6 address may be generated based on manipulation of fewer bytes or bits of the MAC address.

It is noted that, as indicated above, the selection of bytes of the MAC address that are used to generate the IP address may vary in terms of the number of bytes selected, the location of the bytes selected, and the like. For example, if five bytes or six bytes of the MAC address are selected for generation of an IPv6 address, this should be sufficient to guarantee uniqueness of the IP address; on the other hand, if fewer than six or five bytes of the MAC address (e.g., four bytes, three bytes, two bytes, or the like) are selected for generation of the IPv6 address then there may be problems with ensuring uniqueness of the IPv6 address. Similarly, for example, if only three bytes of the MAC address are selected for generation of an IPv4 address, then there may be problems with ensuring uniqueness of the IPv4 address. For example, depending on the location of the bytes selected for generation of an IP address there may be problems with ensuring uniqueness of the IP address (e.g., least significant bytes of 00 or FF in the MAC address would result in least significant bytes of 00 or 255 in IP, both of which may be problematic as discussed further below). For example, if the MAC address is 01:11:22:33:00 and the three least significant bytes of the MAC address are used for the IP address, the resulting IPv4 address would be x.34.51.0, which is problematic since 0 is the network identifier in IP. For example, if the MAC address is 01:11:22:33:ff and the three least significant bytes of the MAC address are used for the IP address, the resulting IPv4 address would be x.34.51.255, which is problematic since 255 is broadcast in IP. Accordingly, in at least some example embodiments, one or more types of manipulation of the selected bytes of the MAC address (e.g., bit shifting operations, logical operations such as logical OR operations or other types of logical operations, or the like, as well as various combinations thereof may be performed to ensure uniqueness of the IP address.

In one example embodiment, the bytes of the MAC address that are used to generate the IP address may be shifted to the left by two bit positions and then a logical OR operation is performed with two bits where the two bits used for the logical OR include at least one "0" (or, in other words, are not all "1"s). For example, assume that the three least significant bytes of a MAC address are going to be used to generate a unique IPv4 address. In this example, assume that the three bytes of the MAC address are 22:33:ff. The binary representation of the three bytes of the MAC address 22:33:ff is 0010 0010 0011 0011 1111 1111. The binary representation 0010 0010 0011 0011 1111 1111 is shifted to the left by two bits, which results in a shifted binary representation 1000 1000 1100 1111 11xx. The shifted binary representation 1000 1000 1100 1111 11xx is logically "OR"ed with 01, which results in a binary representation of 1000 1000 1100 1111 1111 1101 for the three least significant bytes of the IPv4 address. This corresponds to bytes of 136.207.253 for the three least significant bytes of the IPv4 address.

In various example embodiments, the bytes of the MAC address that are used to generate the IP address may be shifted to the left by N bit positions (N≥1) and then a logical OR operation may be performed with N number of bits where the N bits used for the logical OR operation include at least one "0" (or, in other words, are not all "1"s). For example, where N=3, the logical OR operation may be performed using 000, 001, 010, 011, 100, 101, or 110. It is noted that, while different values of N may be used, a higher value of N results in a greater shift to the left and, as a result, more uniqueness is lost as less bits of the MAC address are used to generate the IP address. Accordingly, the value of N may be used to balance a need for uniqueness with a need to represent other information within the IP address (e.g., the network assigned by a vendor). It will be appreciated that, although primarily presented with respect to use of specific types of operations to generate an IP address from a MAC address (e.g., specific bit shift operations in terms of the number of bit positions shifted and the direction of the shift, specific logical operations such as logical OR operations, or the like), various other types of operations may be used to manipulate all or part of a MAC address in order to generate an IP address from the MAC address.

The network elements 111, as discussed herein, are configured to perform various address generation functions for generating addresses for the network elements. For example, a network element 111 that has a first address associated therewith may be configured to generate a second address associated with the first address and to support association of the second address with the network element 111. For example, a network element 111 may select, from a first address of the network element 111 (e.g., a MAC address of the network element 111) a first set of bits of the first address of the network element 111, generate, based on at least one operation on the first set of bits of the first address of the network element 111, a second set of bits, generate, based on the second set of bits, a second address for the network element 111, and associate the second address for the network element 111 with the network element 111. The association of the second address for the network element 111 with the network element 111 may be performed locally at the network element 111 (e.g., storage of the second address for the network element 111 such that it is associated with the network element 111, creation and storage of a mapping between the first address of the network element 111 and the second address for the network element 111, or the like, as well as various combinations thereof), may be performed based on a communication by the network element 111 (e.g., sending a message to the network controller 120 that reports the second address for the network element 111 or a mapping between the first address of the network element 111 and the second address for the network element 111, communicating with the network controller 120 using the second address for the network element 111, or the like, as well as various combinations thereof), or the like, as well as various combinations thereof. It will be appreciated that at least some such address generation functions may be performed by the address generation elements 112 of the network elements 111.

It will be appreciated that, although primarily described with respect to generating unique addresses for network elements of a communication system within the context of a particular type of communication system supporting particular communication protocols and particular address types (e.g., generation of an IP address from a MAC address), various example embodiments for supporting generation of unique addresses for network elements may be applied for supporting generation of unique addresses for network elements in other types of communication systems, for other types of communication protocols, for other address types, or the like, as well as various combinations thereof.

It will be appreciated that, although primarily described with respect to generating unique addresses for specific types of network entities (namely, for network elements), generating unique addresses for network elements may be applied for supporting generation of unique addresses for other types of network entities (e.g., ports of network elements, interfaces of network elements, or the like, as well as various combinations thereof).

Figure 2:
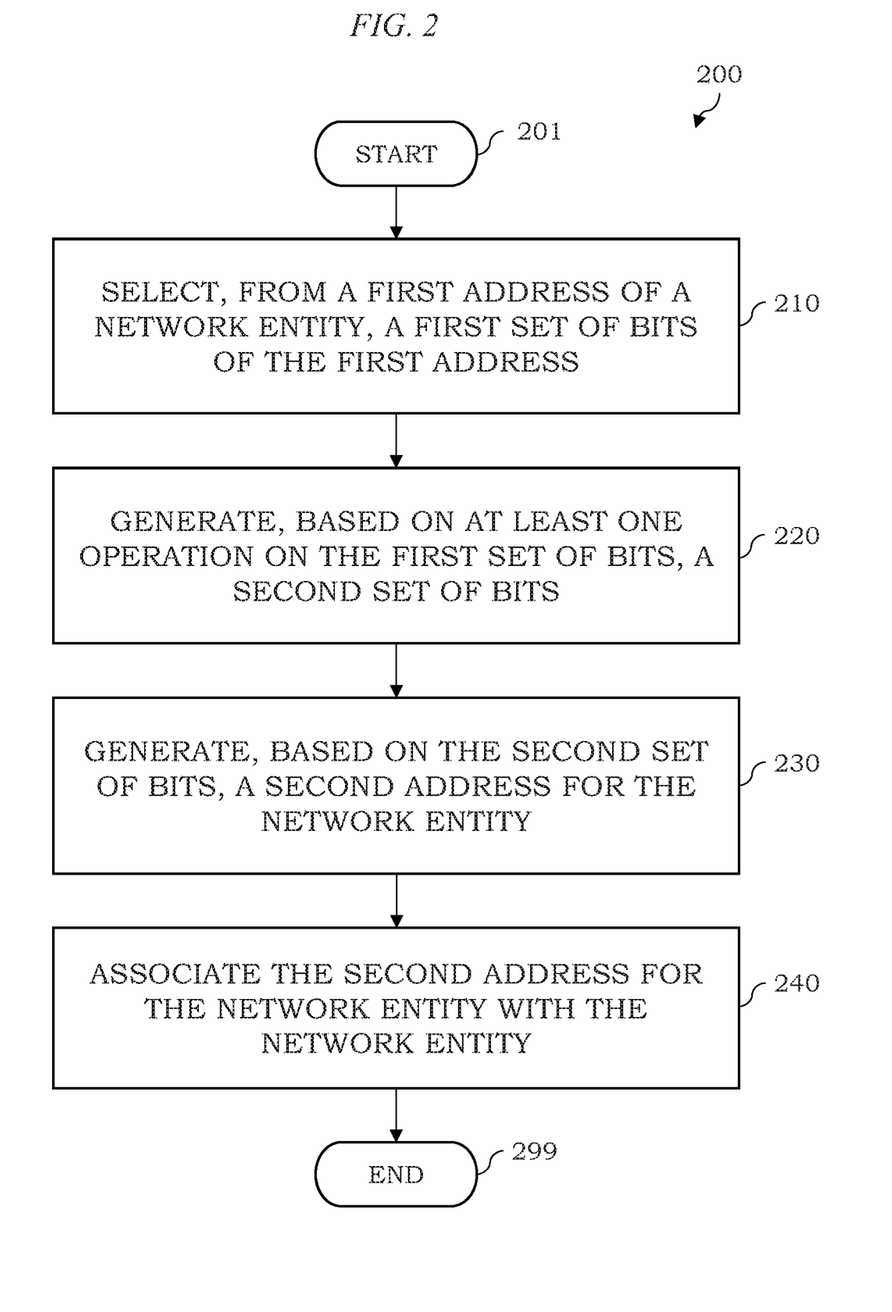
FIG. 2 depicts an example embodiment of a method for supporting generation of an address for a network entities.

FIG. 2 depicts an example embodiment of a method for supporting generation of a unique address for a network element. It will be appreciated that, although primarily presented as being performed serially, at least a portion of the functions of method 200 may be performed contemporaneously or in a different order than as presented with respect to FIG. 2.

At block 201, the method 200 begins.

At block 210, select, from a first address of a network entity, a first set of bits of the first address. The network entity may be a network element, a port of a network element, an interface of a network element, or the like. The first address of the network entity may be a unique address of the network entity. The first address may be a chassis address of the network entity or a port address of the network entity. The first set of bits of the first address may be selected based on a determination that the first set of bits of the first address provides for uniqueness of the first address of the network entity or likely provides for uniqueness of the first address of the network entity. The first set of bits of the first address may include at least a portion of the first address of the network entity. The first set of bits of the first address may include three to five bytes of the first address. The first set of bits of the first address may include all bytes of the first address.

At block 220, generate, based on at least one operation on the first set of bits, a second set of bits. The at least one operation may include a shift of the first set of bits of the first address by a number of bit positions. The at least one operation may further include a logical OR operation using a number of bits equal to the number of bit positions. The number of bit positions may be one and the number of bits may be one. The logical OR may be based on a value that includes a logical zero. The number of bit positions may include at least two bit positions and the number of bits may include at least two bits. The logical OR operation may be based on a value that includes at least one logical zero.

At block 230, generate, based on the second set of bits, a second address for the network entity. The second address for the network entity may be a unique address for the network entity. The second address for the network entity may be generated using the second set of bits as least significant bits of the second address for the network entity.

In at least some example embodiments, any remaining bits of the second address for the network entity may be used to identify a network (e.g., the three least significant bytes of the second address may be used for uniqueness of network entity and the most significant byte of the second address may be used to identify a network). In at least some example embodiments, any remaining bits of the second address may be used to identify a network or used to identify a network and a static host value (e.g., the six least significant bytes of the second address may be used for uniqueness of the network entity and the ten most significant bytes of the second address may be used to identify a network or used to identify a network and a static host value).

At block 240, associate the second address for the network entity with the network entity. The association of the second address for the network entity with the network entity may be performed locally at the network entity (e.g., storage of the second address for the network entity such that it is associated with the network entity, creation and storage of a mapping between the first address of the network entity and the second address for the network entity, or the like, as well as various combinations thereof), may be performed based on a communication by the network entity (e.g., sending a message to a network controller that reports the second address for the network entity or a mapping between the first address of the network entity and the second address for the network entity, communicating with a network controller using the second address for the network entity, or the like, as well as various combinations thereof), or the like, as well as various combinations thereof.

At block 299, the method 200 ends.

It will be appreciated that, although primarily described with respect to generating unique addresses for network elements of a communication system within the context of automated network provisioning (e.g., ZTP or the like), various example embodiments for supporting generation of unique addresses for network elements may be applied within various other contexts (e.g., generation of addresses for use in supporting data plane communications within the communication system, generation of addresses for use in supporting control plane communications within the communication system, generation of addresses for supporting reconfigurations within the communication system, or the like, as well as various combinations thereof).

Various example embodiments for supporting generation of unique addresses for network elements may provide various advantages or potential advantages. For example, various example embodiments for supporting generation of unique addresses for network elements may enable generation of a unique IP address for a network element based on a MAC address of the network element, thereby enabling automated provisioning of the network element. Various example embodiments supporting generation of unique addresses for network elements may provide various other advantages or potential advantages.

Figure 3:
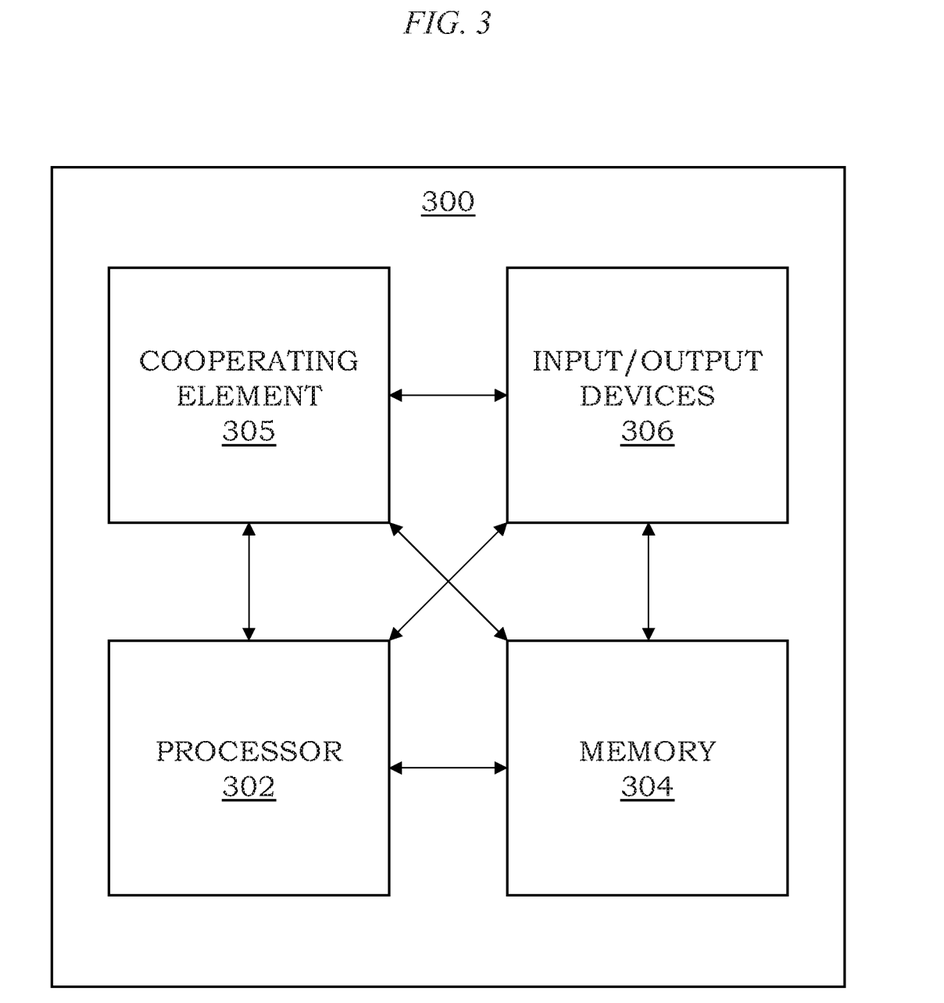
FIG. 3 depicts an example embodiment of a computer suitable for use in performing various functions presented herein.

FIG. 3 depicts an example embodiment of a computer suitable for use in performing various functions presented herein.

The computer 300 includes a processor 302 (e.g., a central processing unit (CPU), a processor, a processor having a set of processor cores, a processor core of a processor, or the like) and a memory 304 (e.g., a random access memory, a read only memory, or the like). The processor 302 and the memory 304 may be communicatively connected. In at least some example embodiments, the computer 300 may include at least one processor and at least one memory including a set of instructions which, when executed by the at least one processor, cause the computer 300 to perform various functions presented herein.

The computer 300 also may include a cooperating element 305. The cooperating element 305 may be a hardware device. The cooperating element 305 may be a process that can be loaded into the memory 304 and executed by the processor 302 to implement various functions presented herein (in which case, for example, the cooperating element 305 (including associated data structures) can be stored on a non-transitory computer-readable storage medium, such as a storage device or other suitable type of storage element (e.g., a magnetic drive, an optical drive, or the like)).

The computer 300 also may include one or more input/output devices 306. The input/output devices 306 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 300 may represent a general architecture and functionality suitable for implementing functional elements described herein, portions of functional elements described herein, or the like, as well as various combinations thereof. For example, computer 300 may provide a general architecture and functionality that is suitable for implementing one or more elements presented herein, such as network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory including computer program code;
wherein the at least one memory and the computer program code are configured to, with the at least one processor, cause the apparatus to:
select, from a first address of a network entity, a first set of bits of the first address;
generate, based on a set of operations on the first set of bits, a second set of bits, wherein the set of operations includes a shift of the first set of bits by a number of bit positions and a logical operation using a number of bits equal to the number of bit positions;
generate, based on the second set of bits, a second address for the network entity; and
associate the second address for the network entity with the network entity.

2. The apparatus of claim 1, wherein the first address of the network entity includes a first unique address of the network entity, wherein the second address for the network entity includes a second unique address for the network entity.

3. The apparatus of claim 1, wherein the network entity includes a network element, a port of a network element, or an interface of a network element.

4. The apparatus of claim 1, wherein the first address includes a chassis address of the network entity or a port address of the network entity.

5. The apparatus of claim 1, wherein the first set of bits is selected based on a determination that the first set of bits provides for uniqueness of the first address of the network entity.

6. The apparatus of claim 1, wherein the first set of bits includes at least three bytes of the first address of the network entity.

7. The apparatus of claim 1, wherein the first set of bits includes three to five bytes of the first address of the network entity.

8. The apparatus of claim 1, wherein the first set of bits includes all bytes of the first address of the network entity.

9. The apparatus of claim 1, wherein the shift of the first set of bits of the first address is a shift of the first set of bits in a direction from a least significant bit toward a most significant bit.

10. The apparatus of claim 1, wherein the logical operation includes a logical OR operation using the number of bits equal to the number of bit positions.

11. The apparatus of claim 1, wherein the number of bit positions includes one bit position and the number of bits is one bit.

12. The apparatus of claim 1, wherein the logical operation includes a logical OR operation based on a value that includes a logical zero.

13. The apparatus of claim 1, wherein the number of bit positions includes at least two bit positions and the number of bits includes at least two bits.

14. The apparatus of claim 1, wherein the logical operation includes a logical OR operation based on a value that includes at least one logical zero.

15. The apparatus of claim 1, wherein the second address for the network entity is generated using the second set of bits as least significant bits of the second address for the network entity.

16. The apparatus of claim 1, wherein the first address includes a data link layer address and the second address includes a transport layer address.

17. The apparatus of claim 16, wherein the data link layer address includes a Media Access Control (MAC) address and the transport layer address includes an Internet Protocol (IP) address.

18. An apparatus, comprising:
at least one processor; and
at least one memory including computer program code;
wherein the at least one memory and the computer program code are configured to, with the at least one processor, cause the apparatus to:
select, from a first address of a network entity, a first set of bits of the first address;
generate, based on at least one operation on the first set of bits, a second set of bits;
generate, based on the second set of bits, a second address for the network entity, wherein the second address for the network entity is generated using the second set of bits as least significant bits of the second address for the network entity and any remaining bits of the second address for the network entity are used to identify a network; and
associate the second address for the network entity with the network entity.

19. The apparatus of claim 18, wherein the three least significant bytes of the second address are used for uniqueness of network entity and the most significant byte of the second address is used to identify a network.

20. An apparatus, comprising:
at least one processor; and
at least one memory including computer program code;
wherein the at least one memory and the computer program code are configured to, with the at least one processor, cause the apparatus to:
select, from a first address of a network entity, a first set of bits of the first address;
generate, based on at least one operation on the first set of bits, a second set of bits:
generate, based on the second set of bits, a second address for the network entity, wherein the second address for the network entity is generated using the second set of bits as least significant bits of the second address for the network entity and any remaining bits of the second address for the network entity are used to identify a network and a static host value; and
associate the second address for the network entity with the network entity.

21. The apparatus of claim 20, wherein the six least significant bytes of the second address are used for uniqueness of the network entity and the ten most significant bytes of the second address are used to identify a network or used to identify a network and a static host value.

* * * * *